United States Patent
Conde Correia Dos Santos et al.

(10) Patent No.: US 12,453,949 B2
(45) Date of Patent: Oct. 28, 2025

(54) CLOSURE PLATE FOR PRELOADING A PLATE REACTOR, PLATE REACTOR AND MANUFACTURING METHOD THEREOF

(71) Applicant: PETROGAL, S.A., Alcântara (PT)

(72) Inventors: Joaquim António Conde Correia Dos Santos, Oporto (PT); José Carlos Brito Lopes, Oporto (PT); Fernando Gomes De Almeida, Vila Nova de Gaia (PT)

(73) Assignee: PETROGAL, S.A., Alcântara (PT)

( * ) Notice: Subject to any disclaimer, the term of this patent is extended or adjusted under 35 U.S.C. 154(b) by 788 days.

(21) Appl. No.: 17/789,947

(22) PCT Filed: Dec. 30, 2020

(86) PCT No.: PCT/IB2020/062568
§ 371 (c)(1),
(2) Date: Jun. 29, 2022

(87) PCT Pub. No.: WO2021/137183
PCT Pub. Date: Jul. 8, 2021

(65) Prior Publication Data
US 2023/0044578 A1    Feb. 9, 2023

(30) Foreign Application Priority Data

Dec. 30, 2019  (PT) ......................................... 116039
Dec. 31, 2019  (EP) ..................................... 19220292

(51) Int. Cl.
*B01J 19/24*    (2006.01)
*B01J 19/00*    (2006.01)

(52) U.S. Cl.
CPC ......... *B01J 19/0073* (2013.01); *B01J 19/249* (2013.01); *B01J 2219/2453* (2013.01); *B01J 2219/2486* (2013.01)

(58) Field of Classification Search
CPC .................. B01J 19/0073; B01J 19/249; B01J 2219/2453; B01J 2219/2486
USPC ......................................................... 422/211
See application file for complete search history.

(56) References Cited

FOREIGN PATENT DOCUMENTS

| EP | 1720643 A1 | 11/2006 | |
| EP | 2402697 A1 | 1/2012 | |
| EP | 2672214 A1 * | 12/2013 | ............. F28F 9/001 |
| WO | 2013182427 A1 | 12/2013 | |

OTHER PUBLICATIONS

International Search Report and Written Opinion for corresponding PCT Application No. PCT/IB2020/062568 dated Apr. 30, 2021 (11 pages).

* cited by examiner

*Primary Examiner* — Huy Tram Nguyen
(74) *Attorney, Agent, or Firm* — Leason Ellis LLP

(57) ABSTRACT

Closure plate for preloading a plate reactor comprising a stack of plates for planar flow of fluid or fluids, said flow being bounded by said plates, wherein said plates have a given width and a given length, wherein the closure plate comprises a sheet with a face to face against a top of said stack, wherein the face has a convexity lengthwise said sheet, said convexity having a convex cross-section. Plate reactor comprising one said stack of plates and said one or two closure plates for preloading. Method of manufacturing a respective closure plate for preloading and a respective plate reactor.

17 Claims, 7 Drawing Sheets

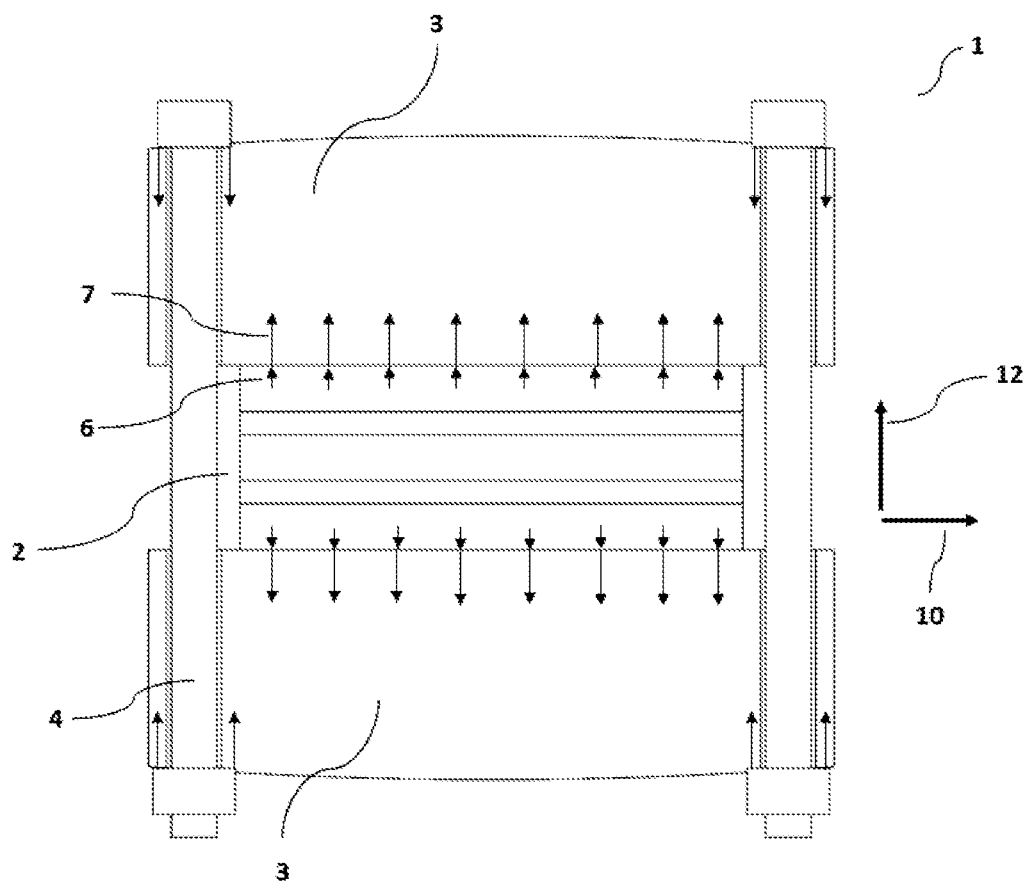
Fig. 7"
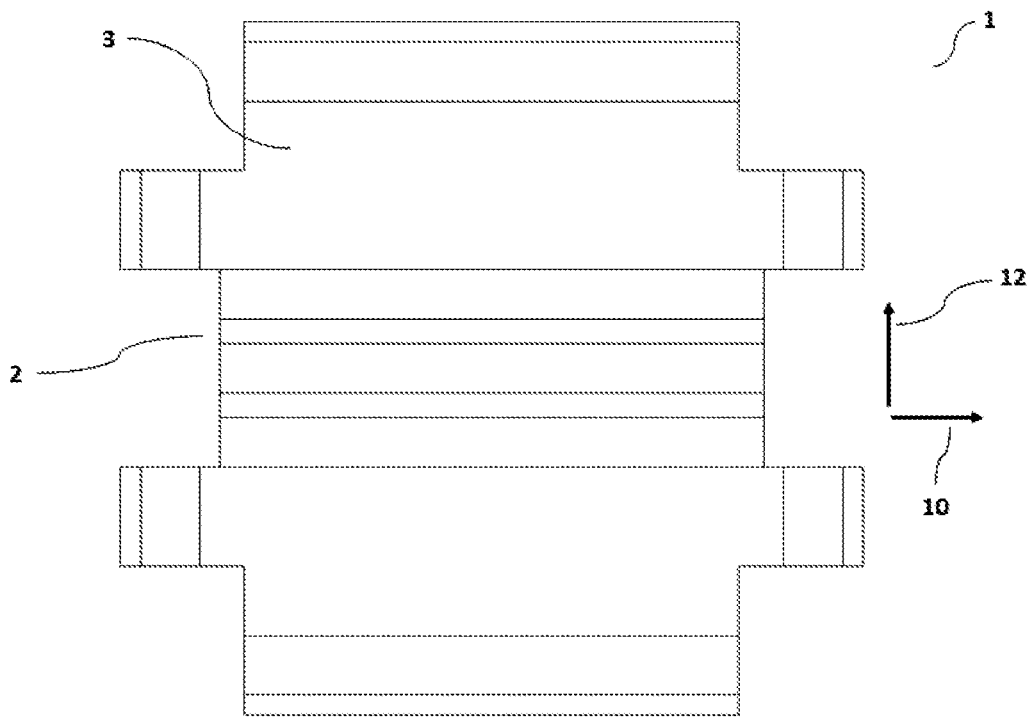
Fig. 8

CLOSURE PLATE FOR PRELOADING A PLATE REACTOR, PLATE REACTOR AND MANUFACTURING METHOD THEREOF

CROSS-REFERENCE TO RELATED APPLICATIONS

This application is a U.S. National Stage Application under 35 U.S.C. § 371 of International Patent Application No. PCT/IB2020/062568, filed Dec. 30, 2020, which claims priority to Portugal Patent Application No. 116039, filed Dec. 30, 2019 and EP Application Serial No. 19220292.7, filed Dec. 31, 2019, the contents of which are each hereby incorporated by reference in their respective entireties.

TECHNICAL FIELD

The present description relates to a closure plate for preloading a plate reactor, a plate reactor with said closure plate, method of use and method of manufacturing thereof.

BACKGROUND

Plate reactors allow reactions under extreme pressure and temperature conditions to be carried out. However, these same extreme conditions introduce difficulties in the mechanical containment and tightness of this type of reactor. See for example EP1720643A1, EP2402697A1 or WO2013/182427A1.

The alternative would be the use of cylindrical or spherical reactors, naturally with better physical containment and tightness characteristics, but without the desired characteristics of plate reactors, namely high contact areas that provide increased reaction efficiency and speed for obtaining the desired products.

There is, therefore, a need in the state of the art, to obtain plate reactors with strongly improved conditions of tightness and containment.

These facts are described in order to illustrate the technical problem solved by the embodiments of the present document.

General Description

It is an objective of the present embodiments to provide a solution to the problem of obtaining plate reactors with improved tightness conditions. The described solution includes a closure plate capable of providing these improved tightness conditions, even under extreme pressure and temperature conditions.

The present embodiments are particularly useful for application in chemical reactions that, due to their pressure and/or temperature, would not have previously been possible in plate reactors.

The solution presented in the present description is based namely on the fact that one or two closure plates, with particular characteristics, allow the compression of the set of plates of a plate reactor in a particular area and in a particular way, in order to ensure the desired tightness and containment results.

These facts are described in order to illustrate the technical solution envisaged by the present invention.

A plate reactor is a reactor in which one or more physical-chemical processes occur, typically in one or more planar fluid flow zones bounded by sheets, which are designated plates and which are arranged in a stack. Often, to favour the occurrence of the processes, the areas where the physical-chemical processes occur must be under controlled pressure and temperature. This type of reactor configuration is mainly preferred in situations where high areas of contact with the reaction fluids are required to promote rapid and effective heat exchanges with the outside. It should be noted that many of the physical-chemical processes are generally easier to implement and optimize when performed in two-dimensional flow geometries incorporated in thin plates, as is the case with plate exchangers and micro-reactors. In the particular case of plate reactors, in a particular embodiment also known as "NETmix"™, see for example EP1720643, and in many applications thereof, there are at least three reasons for the use of a plate reactor: ease of implementation in the two-dimensional form of most mixture and reaction processes involved; markedly two-dimensional internal shapes for the flow zones; the need to have a high heat transfer capacity to the exterior of the reactor.

Reaction plates are plates including the principal forms of the zones where the physical-chemical processes occur, areas circulated by fluids involved in the physical-chemical processes, reactive fluids and product fluids, active areas for surface reaction and heat transfer.

Temperature control plates are plates which include the main shapes of the areas where a thermal fluid circulates for temperature control.

Sometimes, these reactors include plates whose primary function is to filter, such as membranes. These reactors sometimes include distribution plates, whose main function is to assist in the conduction, distribution and sealing of fluids.

Closure plates are boundary plates responsible for providing adequate mechanical stability to the plate stack and containment of the internal pressure, being typically arranged on both tops of the plate stack or, alternatively, over one of the tops of the plate stack.

In the most common solution, the closure plates are directly joined to each other by tightening, between them, a stack of plates for: reaction, temperature control, distribution or others. When the internal pressure of use is significant, the usage of steel as the material for the closure plates is frequent. We must not forget that among common materials, steel is one of the most rigid, although other materials or alloys of adequate stiffness can be used alternatively. Sometimes, these reactors use tensioned parts, such as screws, to connect the two closure plates, extending perpendicularly to the principal plane of the plates. Especially when the internal pressures and/or temperature are higher, these traction means can be placed passing through the middle of the active area and the temperature control areas. This solution allows to increase the pressure and/or temperature of use. However, it has the following main drawbacks: the occupied space, the mandatory additional seals and the fact that it creates limitations to the design of the active area hindering the optimization of the fluid dynamics necessary for physical-chemical process optimization.

A stack is understood as the stacking of plates for reaction, temperature control, distribution, membranes, etc., forming the plate reactor. It should be noted that a stack can have from a minimal number to dozens (and possibly more than a hundred) of plates.

For framing purposes, it can be said that plate reactors, depending on the temperature value and internal operating pressure, usually have: a dimension in the width direction larger than 50 mm, which may even be larger than 0.5 m; a dimension in the length direction larger than 50 mm without any maximum limit, that is, it can be of the order of several meters, for example; reaction and heat transfer plates with material thicknesses typically between 0.5 mm and 10 mm; closure plate thickness for example, larger than 10 mm and may even be larger than 0.1 m.

A closure plate is described for preloading a plate reactor comprising a stack of plates for planar flow of a fluid or fluids, said flow being bounded by said plates, wherein said plates have a given width and a given length, wherein the closure plate comprises a sheet with a face to face against a top of said stack, wherein the face has a convexity lengthwise said sheet, said convexity having a convex cross-section.

The closure plate comprises a portion proximal to the convexity (this portion comprising the face with the convexity) and a portion distal from the convexity (this portion not overlapping the proximal portion), and wherein the closure plate comprises pre-warping means arranged transversely (in respect of the closure plate) in the portion distal from the convexity in order to cause said convexity.

The pre-warping means are arranged to apply a suitable pre-stress to obtain the desired convexity. The portion or sheet of the closure plate proximal to the convexity is the portion or sheet that includes the face that makes contact with the stack. The portion or sheet of the closure plate distal from the convexity is the portion or sheet opposite to the portion or sheet including the face that contacts the stack.

In one embodiment, the warping means are tie rods arranged in cross holes in the portion distal from the convexity or arranged transversely between recesses in the portion distal from of the convexity.

In one embodiment, the tie rods are screws and females arranged in cross (transversal) holes in the portion distal from the convexity.

In one embodiment, the tie rods are clamps arranged transversely between recesses in the portion distal from the convexity.

Alternatively, the convexity may be formed in the sheet itself.

Alternatively, the convexity may be formed by varying the thickness of the closure plate.

Alternatively, the convexity is formed by a mechanical or chemical process, in particular by chemical etching; milling; moulding.

In one embodiment, the convexity is formed by the pre-warping of the closure plate, with the thickness of the closure plate being constant.

In one embodiment, the convexity is formed by a mechanical or chemical process, in particular chemical etching; stamping or stretching; previous hot or cold warping of the sheet.

In one embodiment, the closure plate comprises a sheet proximal to the convexity and a sheet distal from the convexity, wherein the sheets are coupled together (as parallel sheets), and wherein the proximal sheet was previously compressed transversely and/or the distal sheet was previously tensioned transversely before the plates were coupled together, in order to cause said convexity.

In one embodiment, said cross-section has a central convexity, particularly said cross-section is symmetrical and, more particularly, is a bell-shaped curve.

In one embodiment, the closure plate is made of metal, in particular steel.

In one embodiment, said face has the convexity substantially lengthwise of the area to be pressurized of said sheet.

In one embodiment, said face has the convexity substantially lengthwise of said sheet.

A plate reactor is further described comprising a stack of plates for planar flow of fluid or fluids, said flow being bounded by said plates, comprising one or two closure plates for preloading a plate reactor according to any one of the described embodiments, said plates being arranged on one or both of the tops of said stack for closing the reactor.

In one embodiment, the plates in the plate reactor stack are not directly welded together.

In one embodiment, the closure plate or plates are not directly welded with the stack plates.

A method is further described for manufacturing a preloading closure plate according to any one of the embodiments described, comprising the step of forming or causing said convexity.

One embodiment comprises the step of arranging and actuating pre-warping means transversely (in respect of the closure plate) in the portion distal from the convexity in order to cause said convexity.

A method for manufacturing, assembling or adapting a plate reactor is also described, comprising the step of using one or two closure plates, for preloading a plate reactor, according to any one of the embodiments described.

BRIEF DESCRIPTION OF THE FIGURES

For a more facilitated understanding, figures are herein attached, which represent preferred embodiments which are not intended to limit the object of the present description.

FIG. 7: Schematic representation of a cross-section of an embodiment depicting the same closure plates of FIG. 5, now tightened around a stack that is subject to internal pressure, wherein a schematic representation of the internal pressure and the corresponding contact pressure can be observed.

FIG. 8: Schematic representation of a cross-section of a preferred embodiment, according to the present specification. In this figure, the reactor is not yet pre-stressed or tightened, which is why the figure only shows the closure plates and the stack.

DETAILED DESCRIPTION

Figure 1:
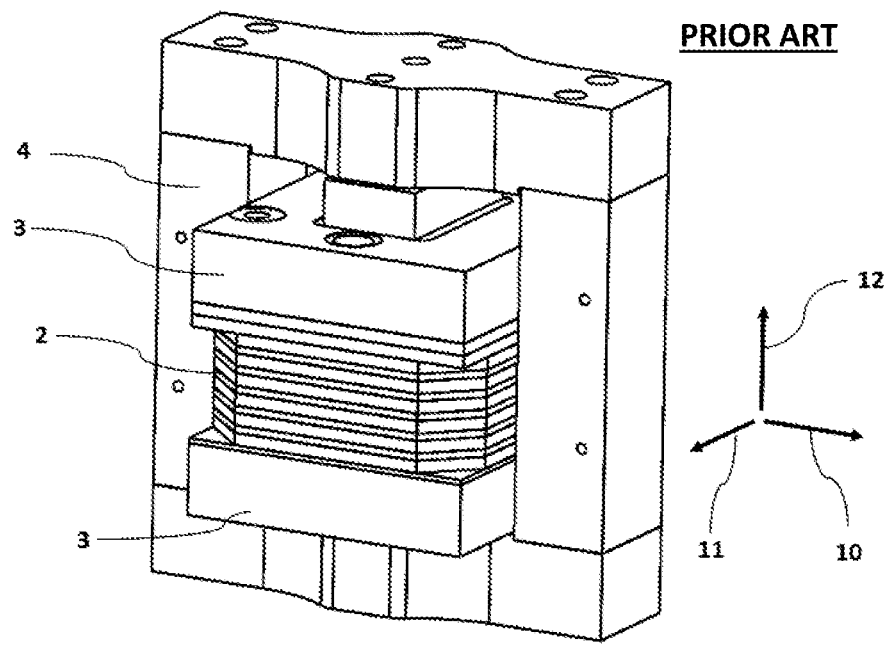
FIG. 1: Schematic representation of a three-dimensional perspective view of a plate reactor, depicting the stack of plates, closure plates and closure means, according to a comparative example.

The structural resistance limitations of the closure plates (3) hinder the operation of these reactors at internal pressures (7) and/or high temperatures, especially in reactors where the plates are not welded together. Thus, in these reactors, to allow operation at internal pressures (7) and/or high temperatures, adequate closure and sealing means are required. The limitation of use with internal pressure (7) of the plate reactors is a direct consequence of the lack of contact pressure (6) and uniformity of its application/distribution on the two end faces of the stack (2). Due to the lack of contact pressure (6), and/or lack of uniformity of its distribution, the two closure plates (3) allow the opening of gaps (5) between the reactor plates, which eventually promotes/facilitates the existence of leakage from the inside of the reactor to the outside, or even in some reactor configurations, promotes internal leakage. Typically, this lack of preload (6) occurs mainly away from the closure means (4), for example, in the central areas of the plate reactor. If a plate reactor is tightened in such a way that, over the entire area in which the internal pressure (7) comes to act, the preload pressure or contact pressure (6) is higher than the internal pressure (7) of use that it will be subjected to, then when the reactor is subjected to internal pressure (6) no gaps (5) shall be opened. This occurs because, after applying the internal pressure, there is still contact pressure (6) between the plates at all contact points. That is, in each of the small areas of the plates, when internal pressure (7) is applied, a reduction in contact pressure (6) of equal value will occur, until the contact pressure (6) reaches a null value. If the internal pressure (7) increases beyond the value that caused the null value of the contact pressure value (6), such increase will induce a distance between plates, the gap (5). Thus, a limit for the existence of a gap (5) is considered as the existence of areas wherein the contact pressure (6) between plates is null.

It should be noted that the existence of a gap not varying during operation, with varying conditions, such as internal pressure (7) or temperature, is less severe than the existence of a gap (5) varying with varying operating conditions. The sealing means collapse more quickly when the gap (5) being sealed undergoes changes.

These facts are described in order to illustrate the technical solution envisaged by the present invention.

Figure 2:
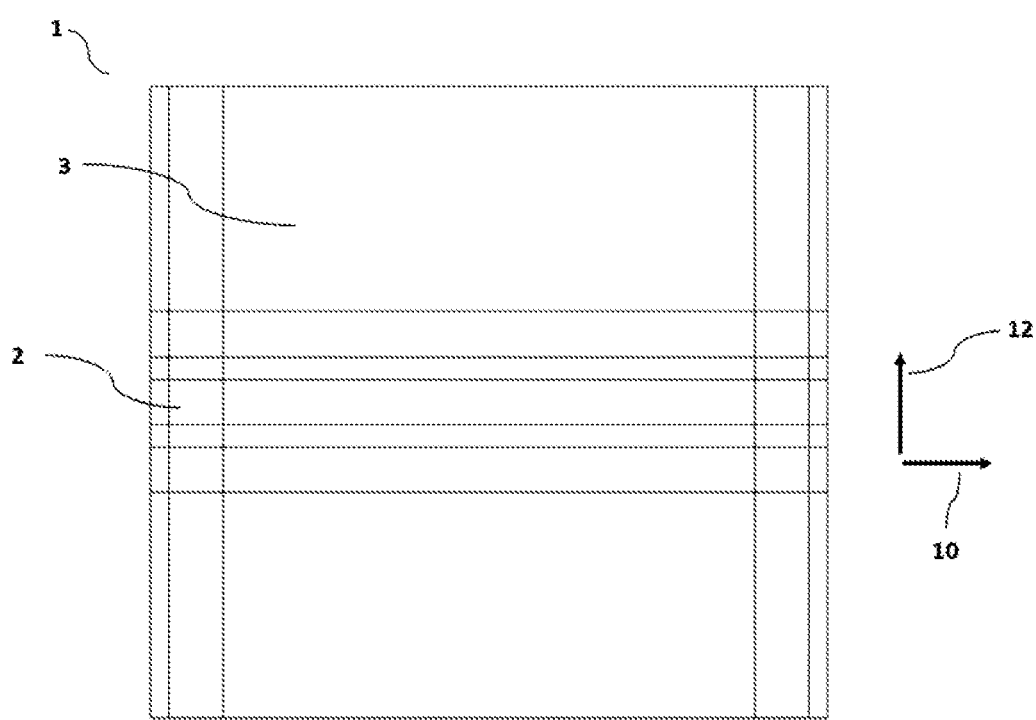
FIG. 2: Schematic representation of a cross-section, that is, a section along the width of the stack, according to an embodiment depicting closure plates resting on a stack, without any type of element tightening the closure plates.
Figure 3:
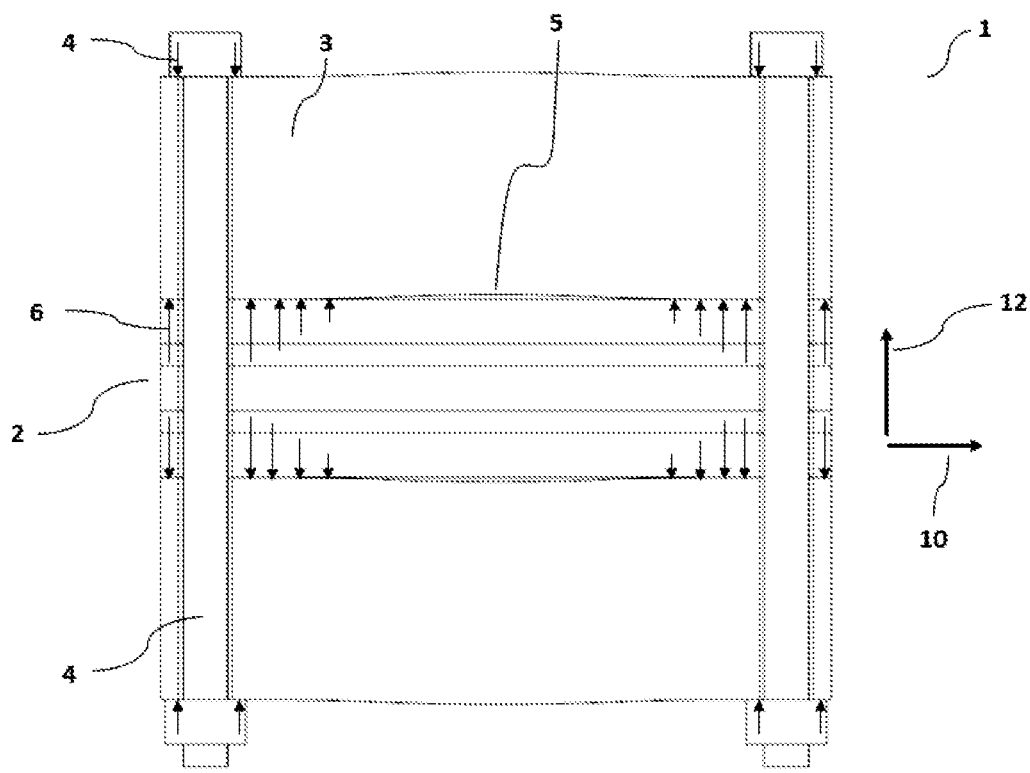
FIG. 3: Schematic representation of a cross-section according to an embodiment depicting closure plates tightened around a stack, wherein the gap existing between the face of the closure plate and the stack has been enlarged in the present representation.
Figure 4:
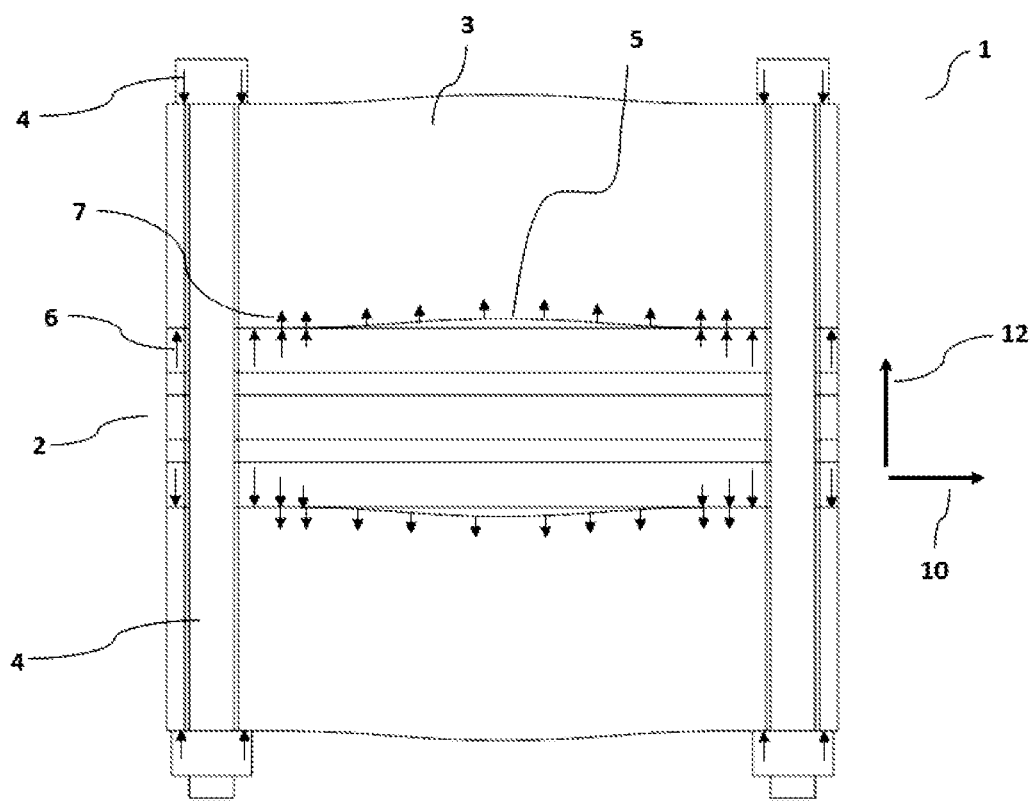
FIG. 4: Schematic representation of a cross-section according to an embodiment depicting closure plates tightened around a stack with the existence of internal pressure acting between the plates, wherein the pressure of contact of the stack plates on the closure plates and the internal pressure acting on the faces of the closure plates contacting the stack has also been schematically represented. In this figure, the gap existing between the face of the closure plate and the stack was enlarged with a magnification factor similar to that of FIG. 3.

In FIGS. 2, 3 and 4, we can observe one of the most common forms of gap opening (5) between the plates of these reactors. In FIG. 2, the closure plates (3) can be observed in contact with a stack (2), without any type of element tightening the closure plates (3).

In FIG. 3, the closure plates (3) can be observed tightened around a stack (2). In this FIG. 3, the deformation existing on the face of the closure plate (3) contacting the stack (2) has been represented with magnification in order to make the gap (5) with a few μm, and that comes to be present between the faces of two consecutive plates visible.

In FIG. 4, the closure plates (3) can be observed tightened around a stack (1) wherein the existence of internal pressure (7) is supposed to act between all plates. In this figure, the deformation existing on the face of the closure plate (3) contacting the stack (2) has been represented with magnification in order to make the gap (5) with a few μm, and that comes to be present between the former and the stack (2) visible. The magnification factor used in this figure is similar to that used in FIG. 3, in order to more easily explain that the application of the internal pressure (7) has increased the gap value (5) which was in fact already present before the application of the internal pressure (7).

According to the present specification, it is intended to solve the internal pressure limitation (6) in plate reactors, namely the operation under pressure that typically assists the appearance or increase of gaps (5) between plates which in turn provide the appearance of leaks. In the particular case of some reactors, the opening of gaps (5) is detrimental to the operation of the reactor since contributing to internal or external leaks and since changing the internal geometry of the reaction zone. The present specification intends to allow the adequate absence of gap opening (5) between plates, primarily when the reactor is used with high internal pressure (7).

It should be noted, in this context, that a gap (5) between plates with values larger than 10 μm or 40 μm, when the reactor is subjected to maximum internal pressure of use, is considered a gap with sufficient size to: promote leakage to the outside or internal leakage; constitute an excessive change in the internal geometry of a plate reactor.

It should be noted that in the case of plate reactors, a use is intended with: more than 10 bar internal pressure, possibly even more than 500 bar; temperatures that in some configurations may be lower than 0° C., whereas in others they may be of the order of 800° C.

It should also be noted that the advantages of use or the present specification become all the more important: the higher the internal pressure (7) in the reactor; the higher the temperature of use; the smaller the largest allowable gap (5) between plates.

The present specification is based on the use of two closure plates (3), with an approximate shape to a sheet of substantial thickness, placed each on each side of the stack (2) and tightened against each other by closure means (4), such as for example screws, bolts or other preloading systems. These closure means (4) are preferably placed on the sides of the area where the internal pressure (6) acts. The closure plates (3), before being tightened against each other surrounding the stack (2), present the face with which they will contact the stack (1) with a convex shape (9) when the plate is seen in a direction parallel to the length direction (11), direction in which the closure means (4) are visible from each side of the reactor. Thus, when they are compressed against each other and with the stack (2) in the middle, by the closure means (4), the closure plates (3) will apply a uniform or at least sufficiently well-distributed pressure (6) to the stack so that, when the reactor is subjected to internal pressure (7), it does not open any gap (5), the contact pressure (6) does not cancel out in areas large enough to promote leakage. The present specification can allow a contact pressure distribution (6) so adequate that even in the limit operating conditions, no gap (5) is opened between the reactor plates with a value, for example, greater than 1 or 2 μm.

Surprisingly, the application of pressure in the areas precisely subject to leakage, the periphery of the plates, does not solve the problem of leakage upon extreme pressures and temperatures. That is, the application of pressure by tightening means on the periphery of the plate stack does not prevent the formation of leaks in operation with extreme pressures and temperatures. The application of peripheral closure means, subject to tensile efforts, which can be materialized by screws and females, does not allow to solve the problem of extreme pressures and temperatures.

To assist in the uniformity of the contact pressure (6) between the stack (1) and each of the closure plates (3), a plate of material with less rigidity, such as a polymeric material, can be placed with elasticity modulus between 0.1 and 10 GPa, 20 to 200 times less than that of steel.

Figure 5:
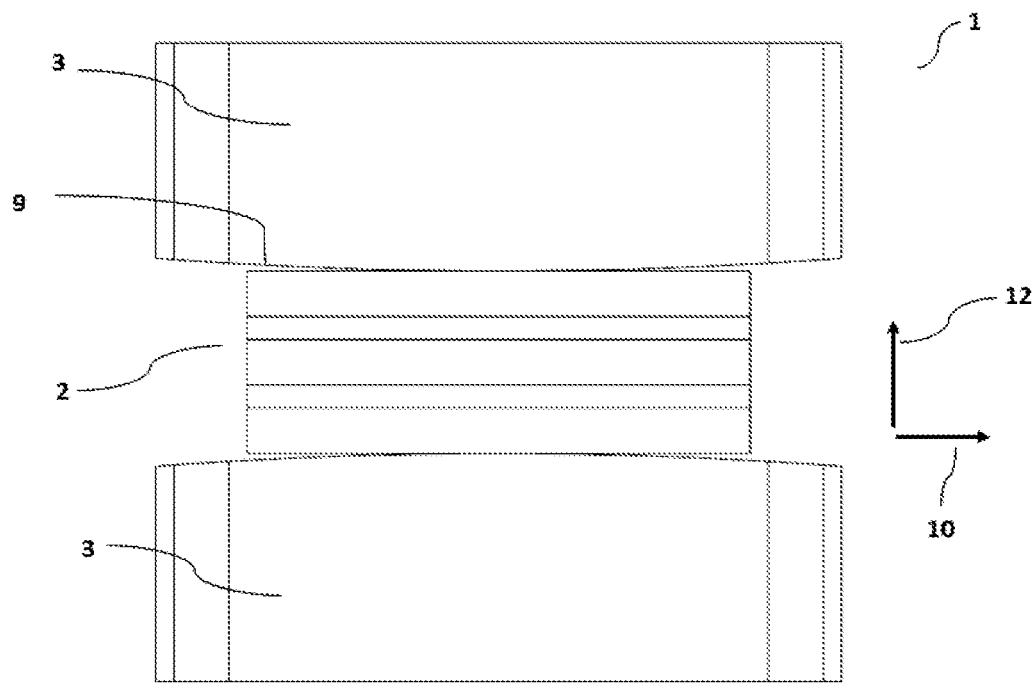
FIG. 5: Schematic representation of a cross-section according to an embodiment depicting closure plates manufactured by milling, rectification, moulding or stretching, arranged around a stack to which they are not yet tightened, the convexity of the face of each closure plate contacting the stack being therefore observable in a magnified manner.
Figure 6:
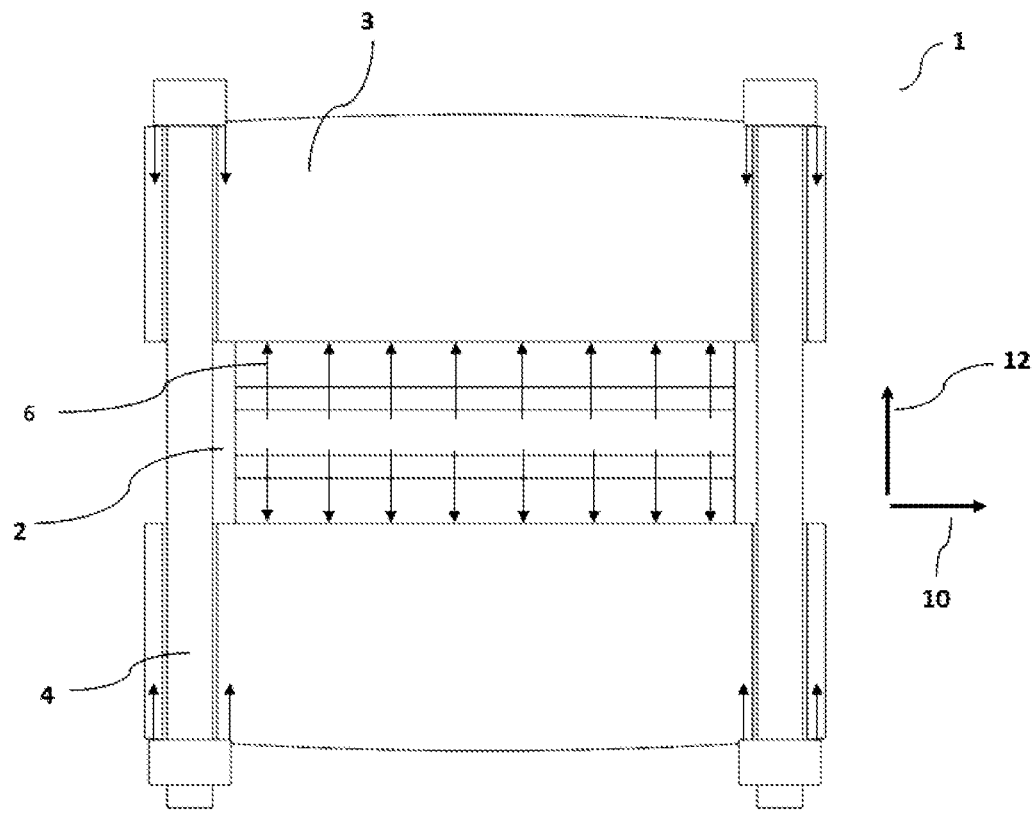
FIG. 6: Schematic representation of a cross-section of an embodiment depicting the same closure plates of FIG. 5, now tightened around a stack, wherein a schematic representation of the contact pressure can also be seen.

The convexity (5) of the closure plates can be achieved by the very shape of the closure plates, obtained by various processes, such as: removal of material, as shown in FIGS. 5, 6 and 7, by rectification, chemical etching, milling; moulding; previous hot or cold warping of the sheet, maintaining the thickness of the plate by folding, not maintaining the thickness of the plate as with stamping, or stretching.

Another way to obtain said convexity is by applying and maintaining pre-stressing in a direction parallel to the face contacting the stack and transversal to the length direction of the reactor plates, that is, in the width direction (10) of the plates. This pre-stress can be obtained by different processes and can also be applied in different ways, and can be applied in an elastic regime or even reaching the plastic regime.

This pre-stress can be applied using two sheets, to materialize each external plate, and its assembly being made in such a way that the sheet away from the stack, said distal, is tensioned by said pre-stress and the sheet close to the stack is compressed by the pre-stressing of the other sheet, before and after its tightening around the stack. For this purpose, screws can be used that tighten these two sheets against each other or any other joining means, such as welding or gluing. Before the joining operation of the two sheets, the sheet close to the stack must be compressed in its direction transverse to the length direction of the plates, and/or the sheet away from the stack, said distal, tensioned in its direction transverse to the length direction of the plates, so that, after being joined together, when the sheet next to the stack, said proximal, is decompressed and/or the sheet farther away from the stack, said distal, is released, the set is provided with a convexity on its face that will contact the stack.

In FIGS. 8, 9, 10, 11 it is possible to observe a preferred way of obtaining said convexity (5) using the application and maintenance of pre-stress in the direction parallel to the face contacting the stack and transversal to the length direction of the reactor plates, width direction (10). Each closure plate (3) is tightened by its pre-warping means (8). Said pre-warping means (8) are close to the opposite face, said distal, which will contact the stack (2). Thus, when these tensioned pre-warping means (8) apply a compression load to that area of the closure plate (3) it eventually deforms making the surface, said proximal, that will contact the stack, convex (9). When the closure plates (3) are tightened around the stack (2), the existence of the convexity (9) eventually assists the contact pressure distribution (6) applied by the stack (2) on the closure plate (3) to be much more regular. The tightening of the closure plates (3) on the stack (2) is guaranteed by the closure means (4), which are subjected to tensile efforts, which can, for example, be materialized by screws and females which are tightened until the desired stress is achieved, or by clamps or tie rods already pre-stressed with the intended stress.

This form of application of the pre-stress, preferential materialization of the present specification, has the added value of providing a substantial reduction of the acting tensile stresses, installed in the closure plate (3), on the side of the plate away from the face contacting the stack (2), said distal, in relation to the other materializations.

It should be noted that in a plate, subject to this type of stress, the stresses acting in its sections will mainly depend on the acting bending moments, while shearing stresses and normal loads are usually of little importance. Plate reactors that operate with internal pressure (7) subject the closure plates (3) to a distributed load, pressure, whether caused by contact between plates, contact pressure (6), whether caused by internal pressure (7). The application of a distributed load on the face of a plate generates bending moments in the plate and, thus, normal stresses, in the resistant sections of the plate, a value to be taken into account when dimensioning the component. It should also be noted that in the present case, preferably, small deformations are observed in the elastic domain, and that the validity of the effect overlap theorem is therefore verified, wherein the total acting stress at each point of a part is the result of the sum of the acting stresses due to the isolated application of each load acting on the part.

In the preferred materialization, the pre-warping means (8) apply to the closure plate (3), in its area furthest from the stack, said distal, normal compression loads to the resistant section. When the closure plates (3) are tightened against each other with the stack (1) in the middle, contact pressures (6) arise on the contact faces of the closure plates (3) with the stack (1), which will generate, in the closure plates (3), bending moments, normal compression stresses in the area close to the stack (2) and normal tensile stresses in the area away from the stack (2). Considering the "overlapping effect theorem", it is quickly concluded that the application of the compression pre-stress by the pre-warping means (8), allows a reduction of the normal tensile stresses acting in the area away from the stack (2) that would result from the application of contact pressure (6) and/or internal pressure (7). The other consequence of applying the compression load of the pre-warping means (8) on the closure plate (3) is the greater regularity of the contact pressure (6) between the plates, which also results in the possibility of increasing the internal pressure (7) of operating without nullifying, at some points, the contact pressure (6) between plates. Thus, the absence of gap opening (5) that provides leakage is guaranteed. Also, the compression load applied by the pre-warping means (8) ensures that should gaps (5) still be present, for example, due to manufacturing defects, these gaps (5) shall always be more stable than in the absence of the pre-warping means (8).

In FIG. 1, as an example, a three-dimensional view shows a plate reactor, wherein the stack (2) of plates, the closure plates (3) and closure means (4) can be observed. This figure also shows the directions that shall be from now on designated width (10), length (12) and thickness (11).

In FIG. 2, the closure plates (3) can be observed resting on a stack (2), without any type of element tightening the closure plates (3).

In FIG. 3, the closure plates (3) can be observed tightened around a stack (2). In this figure, the gap (5) existing between the face of the closure plate (3) and the stack (2) is magnified. This figure also schematically shows the contact pressure (6) of the stack plates (2) on the closure plates (3).

In FIG. 4, the closure plates (3) can be observed tightened around a stack (2) wherein the internal pressure (7) is supposed to act between all plates. In this figure, the gap (5) existing between the face of the closure plate (3) and the stack (2) is magnified. This figure also schematically shows the contact pressure (6) of the stack plates (2) on the closure plates (3) and the internal pressure (7), acting on the faces of the closure plates (3) contacting the stack (2).

FIG. 5 shows closure plates (3) manufactured by milling, rectification, moulding or stretching, arranged around a stack (2) to which they are not yet tightened, the convexity (9) of the face of each closure plate (3) contacting the stack (2) being therefore observable. It should be noted that the convexity (9) was magnified in order to become observable.

FIG. 6 shows the same closure plates (3) of FIG. 5, now tightened around a stack (2). This figure also shows a schematic representation of the contact pressure (6). As in FIG. 5, the convexity, now on the outer face of the closure plate (3), has been magnified in order to be observable. FIG. 7 shows the same closure plates (3) of FIG. 5, now tightened around a stack (2) that is subject to internal pressure (7). Thus, this figure shows a schematic representation of the internal pressure (7) and the corresponding contact pressure (6). As in FIG. 5, the convexity, now on the outer face of the closure plate (3), has been magnified in order to be observable.

FIG. 8 shows a representation of the preferred embodiment according to the present specification. In this figure, the reactor is not yet pre-stressed or tightened, which is why the figure only shows the closure plates (3) and the stack (2).

Figure 9:
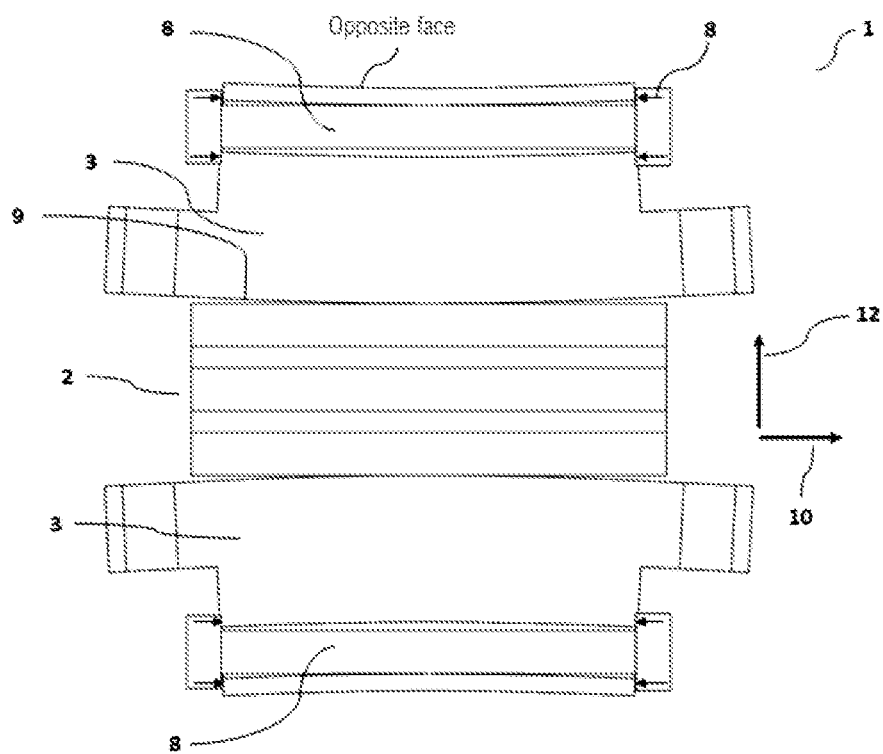
FIG. 9: Schematic representation of a cross-section of a preferred embodiment, according to the present specification. In this figure, the closure plates are already pre-stressed by the pre-warping means, but the reactor is not yet tightened and therefore the deformation caused by the pre-warping means on the closure plate is magnified.

FIG. 9 shows a cross-sectional representation of a preferred embodiment according to the present specification. In this figure, the reactor is already pre-stressed by the pre-warping means (8), but it is not yet tightened, which is why the figure only shows the closure plates (3), the stack (2) and the pre-warping means (8). In this FIG. 8, the deformation, convexity (9), of the face of the closure plate that will contact the stack (2) is magnified so that it can be visible.

Figure 10:
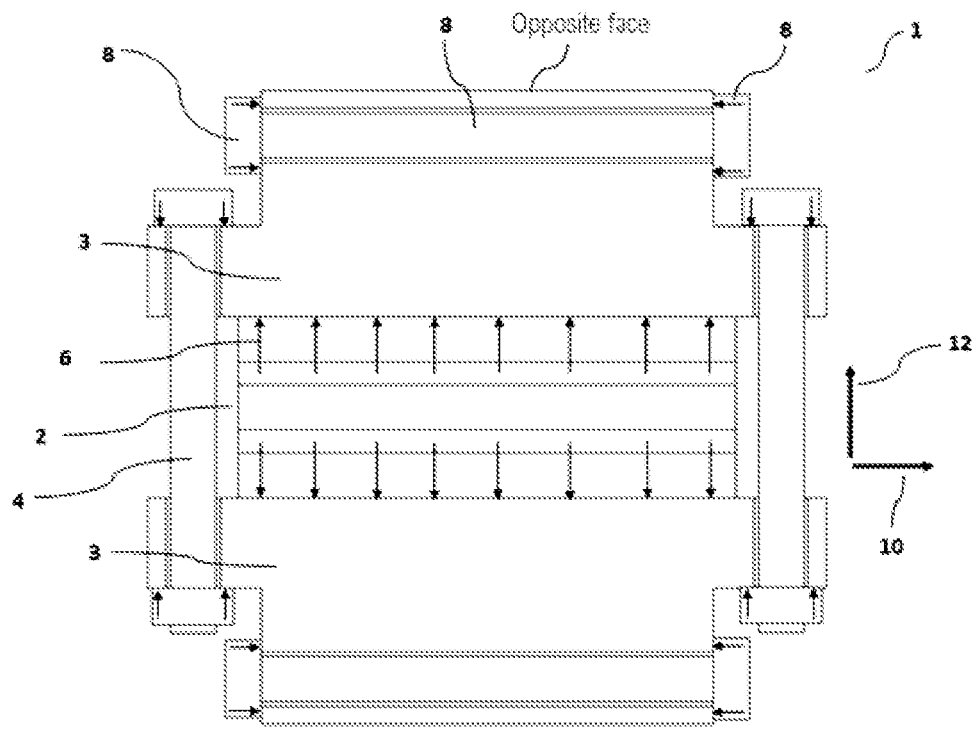
FIG. 10: Schematic representation of a cross-section of a preferred embodiment according to the present specification, wherein the reactor is pre-stressed and tightened by the closure means, wherein a schematic representation of the contact pressure can be observed.

FIG. 10 shows a cross-sectional representation of a preferred embodiment according to the present specification. In this figure, the reactor is already pre-stressed by the pre-warping means (8) and tightened by the closure means (4). This figure shows a schematic representation of the contact pressure (6).

Figure 11:
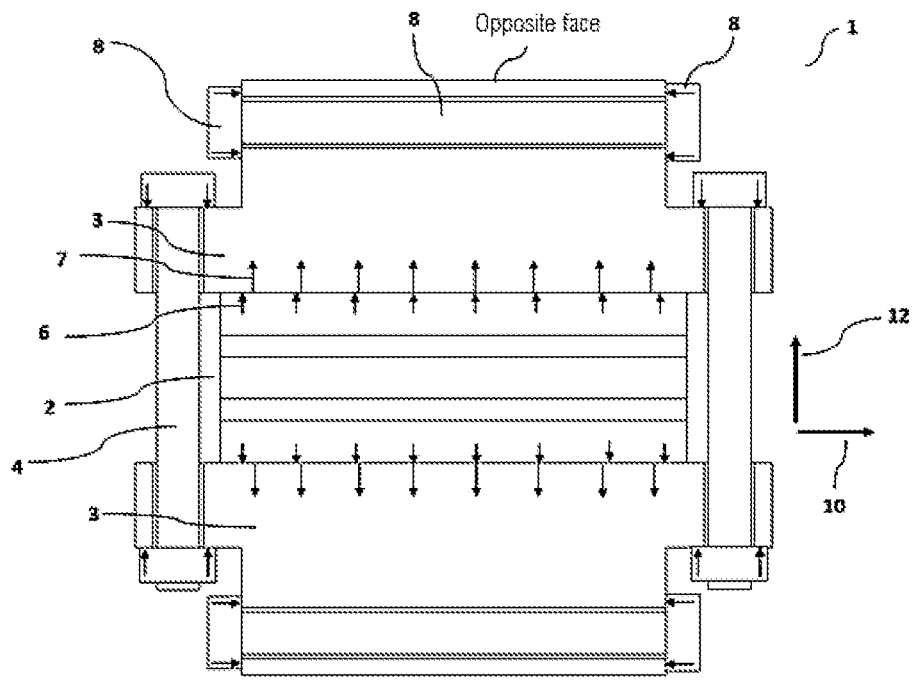
FIG. 11: Schematic representation of a cross-section of a preferred embodiment according to the present specification, wherein the reactor is pre-stressed by the pre-warping means and tightened by the closure means, wherein a schematic representation of the internal pressure and the corresponding contact pressure can be observed.

FIG. 11 shows a cross-sectional representation of a preferred embodiment according to the present specification. In this figure, the reactor is already pre-stressed by the pre-warping means (8) and tightened by the closure means (4). This figure shows a schematic representation of the internal pressure (7) and the corresponding contact pressure (6).

Figure 12:
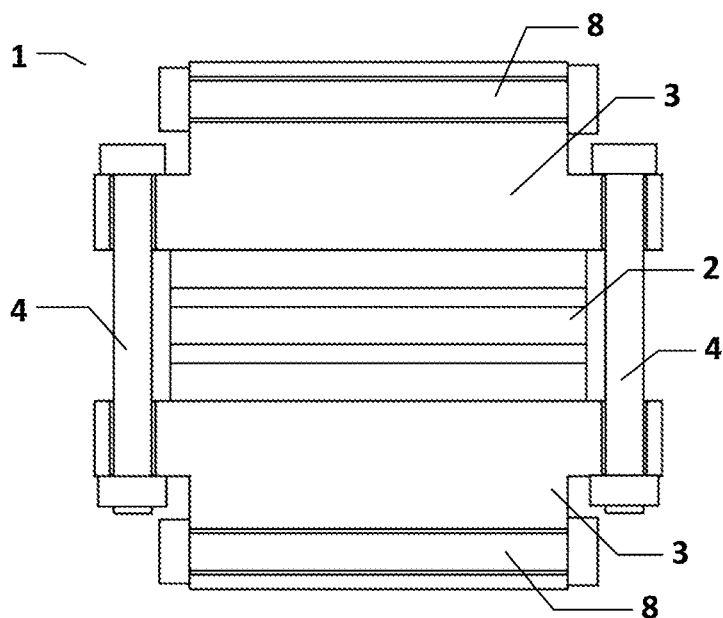
FIG. 12: Schematic representation of a cross-section of a preferred embodiment of the plate reactor, wherein the stack of plates, closure plates and closure means can be observed.
Figure 13:
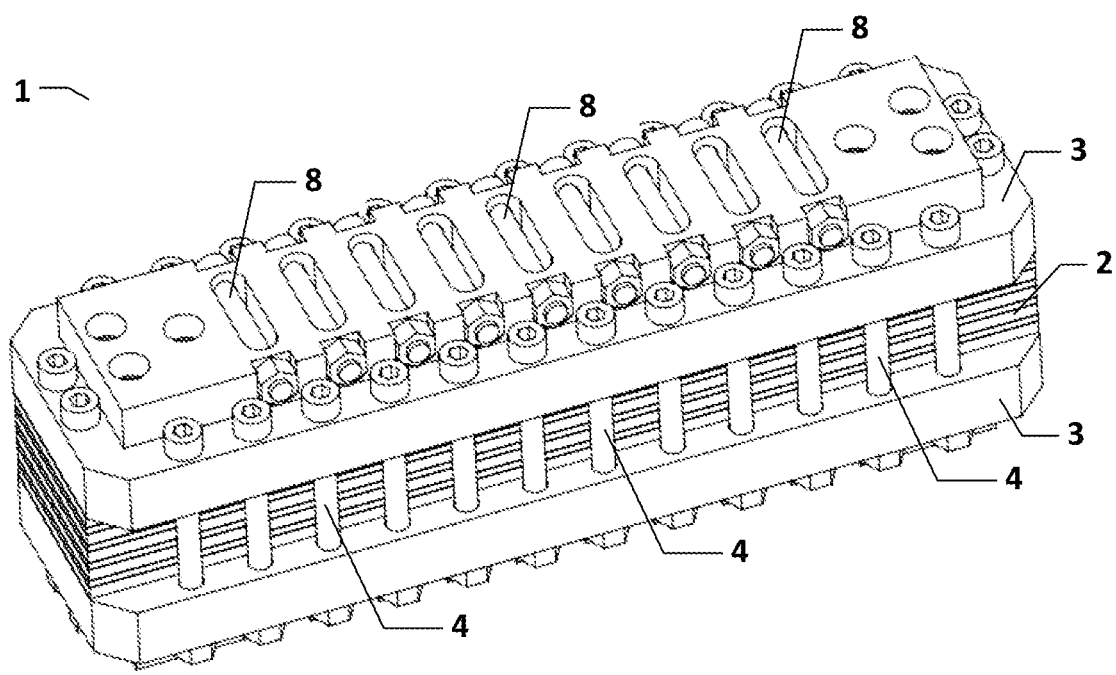
FIG. 13: Schematic representation of a three-dimensional view of a plate reactor, wherein the stack of plates, closure plates and closure means, according to a preferred embodiment can be observed.

FIG. 12 shows a cross-sectional representation of a preferred embodiment and FIG. 13 a perspective view of a preferred embodiment, where the pre-warping means (8) and the closure means (4) are screws and nuts, particularly with the pre-warping screws and nuts arranged in holes and recesses, respectively.

The term "comprises" or "comprising" when used herein is intended to indicate the presence of the features, elements, integers, steps and components mentioned, but does not preclude the presence or addition of one or more other features, elements, integers, steps and components, or groups thereof. The embodiments described are combinable with each other. The present invention is of course in no way restricted to the embodiments described herein, and a person of ordinary skill in the art can foresee many possibilities of modifying it and replacing technical features with equivalents depending on the requirements of each situation as defined in the appended claims. The following claims define additional embodiments of the present description.

The invention claimed is:

1. A plate reactor comprising:
   a stack of reactor plates for planar flow of fluid or fluids, said flow being bounded by said reactor plates, wherein said reactor plates have a predetermined width and a predetermined length; and
   one or two closure plates for preloading the plate reactor, each of said closure plate or plates being arranged on a top of said stack for closing the reactor,
   wherein said closure plate or each of said closure plates comprises a sheet with a face for facing against a top of said stack, wherein the face has a convexity lengthwise on said sheet, said convexity having a convex cross-section,
   wherein the closure plate comprises a portion proximal to the convexity, said proximal portion comprising said face, and a portion distal from the convexity and non-overlapping with the proximal portion, and
   wherein the closure plate comprises pre-warping means in the portion distal from the convexity and arranged transversely in respect of the closure plate to cause said convexity.

2. The plate reactor according to claim 1, wherein the warping means are tie rods arranged in cross holes in the portion distal from the convexity or arranged transversely between recesses in the portion distal from the convexity.

3. The plate reactor according to claim 2, wherein the tie rods are screws and females arranged in transversal cross holes in the portion distal from the convexity or the tie rods are clamps arranged transversely between recesses in the portion distal from the convexity.

4. The plate reactor according to claim 1, wherein the closure plate comprises said sheet with the face with the convexity, which is a sheet proximal to the convexity, and further comprises a sheet distal from the convexity, wherein the two sheets are coupled together, and wherein the proximal sheet was previously compressed transversely and/or the distal sheet was previously tensioned transversely, before the plates were coupled together, in order to cause said convexity.

5. The plate reactor according to claim 1, wherein said cross-section has a central convexity.

6. The plate reactor according to claim 1, wherein the closure plate is made of metal.

7. The plate reactor according to claim 1, wherein said face has the convexity along a full length of the area to be pressurized of said sheet.

8. A method for manufacturing a preloading closure plate for a plate reactor according to claim 1, comprising the step of forming or causing said convexity by arranging and actuating pre-warping means transversely in respect of the closure plate and in the portion distal from the convexity in order to cause said convexity.

9. The method according to claim 8, further comprising a step of mounting one or two of said closure plates on a top or tops of said stack for closing the reactor, for preloading the plate reactor.

10. The plate reactor according to claim 6, wherein the metal is steel.

11. The reactor according to claim 2, wherein the closure plate comprises said sheet with the face with the convexity, which is a sheet proximal to the convexity, and further comprises a sheet distal from the convexity, wherein the two sheets are coupled together, and wherein the proximal sheet was previously compressed transversely and/or the distal sheet was previously tensioned transversely, before the plates were coupled together, in order to cause said convexity.

12. The plate reactor according to claim 2, wherein said cross-section has a central convexity.

13. The plate reactor according to claim 2, wherein the closure plate is made of metal.

14. The plate reactor according to claim 13, wherein the metal is steel.

15. The plate reactor according to claim 2, wherein said face has the convexity along a full length of the area to be pressurized of said sheet.

16. A method for manufacturing a preloading closure plate for a plate reactor according to claim 2, comprising a step of forming or causing said convexity by arranging and actuating the tie rods transversely in respect of the closure plate and in the portion distal from the convexity in order to cause said convexity.

17. The method according to claim 16, further comprising a step of mounting one or two of said closure plates on a top or tops of said stack for closing the reactor, for preloading the plate reactor.

\* \* \* \* \*